United States Patent [19]

Schlumberger et al.

[11] 4,364,575
[45] Dec. 21, 1982

[54] SKI LIFT FOR CHILDREN

[76] Inventors: Stephanie F. Schlumberger, Box 223, Woody Creek, Colo. 81656; Donald H. Rayburn, Box 1532, Aspen, Colo. 81612

[21] Appl. No.: 207,877

[22] Filed: Nov. 18, 1980

[51] Int. Cl.³ .............................................. B62B 9/04
[52] U.S. Cl. .................................. 280/19; 280/12 H
[58] Field of Search .................. 187/1 R; 280/11, 12, 280/601, 818, 12 H, 12 F, 12 M, 18, 19, 24; 9/310 C; 104/173 S

[56] References Cited

U.S. PATENT DOCUMENTS

| 2,437,767 | 3/1948 | Thompson | 280/19 |
| 3,145,030 | 8/1964 | Millis | 9/310 C |
| 3,563,562 | 2/1971 | Carlin | 280/19 |
| 3,779,572 | 12/1973 | Cheney | 280/24 |
| 4,046,393 | 9/1977 | Vadnois | 280/19 |
| 4,110,919 | 9/1978 | Henriichon | 280/19 |

FOREIGN PATENT DOCUMENTS 549485  5/1954  Canada ................................. 280/24

Primary Examiner—F. J. Bartuska
Assistant Examiner—Kenneth Noland
Attorney, Agent, or Firm—Hume, Clement, Brinks, Willian & Olds, Ltd.

[57] ABSTRACT

This invention relates to a ski lift which comprises a frame adapted to be moved over the surface of the snow supported at least partially by snow runners and equipped for attachment to a source of power whereby it may be pulled upwardly on a slope and further having a transverse holding rail disposed horizontally in a spaced relation to the surface of the snow a distance above the level of the snow surface to provide a convenient holding access to children when they are standing at the level of the snow surface, and further having a tough relatively thin flexible sheet-like member of width to extend substantially across the width of the frame and attached at its leading edge to the frame the sheet-like member extending rearwardly and being supported throughout the major extent of its surface area on the surface of the snow and being so positioned with respect to the frame as to provide a carrying surface on which children wearing skis may stand while holding onto the holding rail. One form of the invention contemplates that the rear of the frame be mounted on snow runners while its leading end is provided with a device for hitching it to the rear end of a snowmobile and in this manner be held above the level of the snow surface.

5 Claims, 4 Drawing Figures

FIG. 2
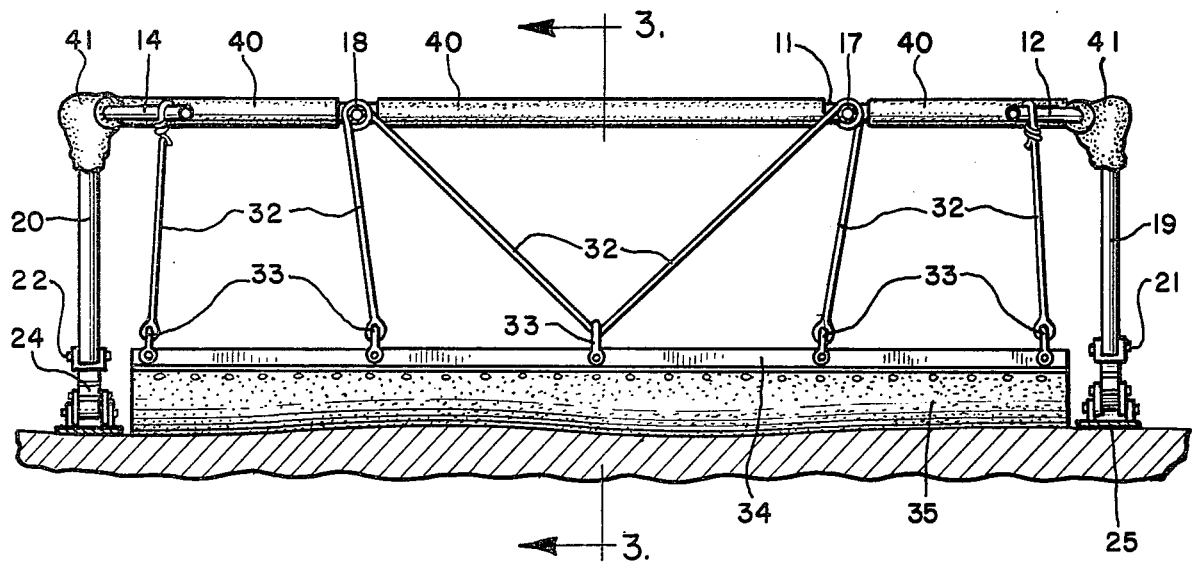
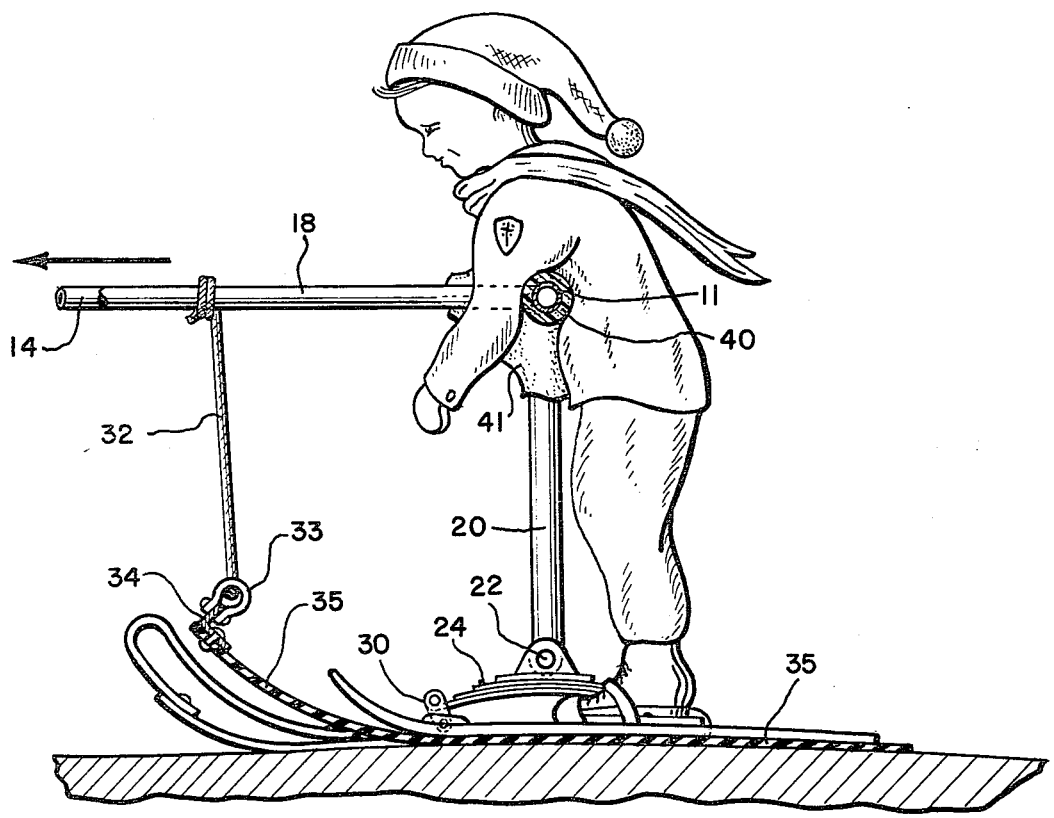
FIG. 3

SKI LIFT FOR CHILDREN

This invention relates to a new and improved device for carrying skiers, particularly small and young children, over snow covered surfaces and is adapted to serve as a ski lift for transporting children up snow covered slopes to an elevated point from which they may ski down.

BACKGROUND OF THE INVENTION

In recent years skiing has becomve a very popular sport and pastime. Ski areas today are equipped with various types of lift devices for conveying skiers both young and adult up the slopes and mountainsides to starting points for particular runs. Today chair lifts are extensively used for this purpose. In addition, T-bar and rope tows are also used particularly for beginners where the terrain permits such use. Skiing today has grown in popularity to the point where it is now commonplace for children at quite young ages to be included in this pastime with the result that at ski resorts many young children including some under the age of 6 years are found on the slopes both with the parents or friends and in ski schools.

Whereas adults and more experienced younger people have little difficulty getting on and off of chair lifts especially after a little practice, chair lifts are not well suited for small children or young beginners. Furthermore rope tows and T-bar lifts which are frequently used for children and beginners are quite difficult for small children to master. This is particularly true of very young children who have trouble meeting the conflicting forces imposed by the frictional drag on the skis moving over the surface of the snow which tends to hold the child back and the upward pull of a rope tow or the upward thrust of a T-bar forcing the child in the upward direction. The rope tow requires that the child handhold the rope to continue his upward movement and the T-bar usually requires that each T-bar unit accommodate two children each to counter balance the weight of the other as the T-bar advances upwardly. The balance ability, strength, and skill of both is involved in a successful ascent of each pair of children.

The successful use of these devices is made more difficult by ruts that are generated as the snow by the tracks of the skis which ruts at times exert counterforces on the skis which are unexpected and difficult for a child to control. It thus occurs that children sometimes fall when using rope tows or T-bars. They sometimes let go of the rope of a rope tow being unable to longer hold on or are displaced from the T-bar and in either case fall in the path of the next oncoming skier or skiers on the lift. In such cases avoidance of possible injury, necessitates that the falling child move out of the path of the oncoming skiers which is difficult when wearing skis or for the operator to stop the lift altogether until assistance can be provided and injury to the child or children avoided.

A better form of a lift is accordingly greatly needed especially for small children.

Accordingly, it is an object of this invention to provide a ski lift which is free of the above named difficulties when employed for children, especially small or young children.

It is a further object of this invention to provide a ski lift especially for children on which the skier stands on a flexible sheet-like member which is supported on the surface of the snow and propelled by a frame moved over the surface of the snow while the skier is holding onto a bar or rail carried by said frame.

It is a further object of this invention to provide a ski lift which propells the skier by the movement of a flexible sheet-like member underlying the skis of the skier, and the movement of a holding bar which is grasped by the skier and moves with said member.

It is a further object of this invention to provide a ski lift which does not require the riding skier to translate and control through his body and leg muscles the opposed forces generated when his skis are frictionally resisting forward movement up a slope and the upwardly pulling force is applied to his arms or body which is characteristic of the performance now required when riding a rope tow or a T-bar tow.

It is a further object of this invention to provide a ski lift which is safe for small children and which allows them to readily mount the lift and readily step off the lift when the ascent of the slope is completed.

These and other objects are contemplated for this invention as will readily appear to one skilled in this art as the following description proceeds.

SUMMARY OF THE INVENTION

This invention relates to a ski lift which comprises a frame adapted to be moved over the surface of the snow supported at least partially by snow runners and equiped with means for attachment to a source of power whereby it may be moved upwardly on a slope or mountainside and having a transverse bar or holding rail disposed horizontally in a spaced relation to the surface of the snow a distance above the level of the snow surface to provide a convenient holding bar or rail for children to hold onto when standing at said surface level and further having a tough relatively thin flexible sheet-like member of width to extend substantially across the width of said frame and attached at its leading edge to a second bar carried by said frame and suspended therebelow near but slightly above the level of the surface of the snow and disposed substantially parallel to said holding bar, said sheet-like member extending rearwardly of said second bar and being supported throughout the major extent of its surface area on the surface of the snow and being so positioned with respect to said frame as to provide a carrying surface for children wearing skis to stand on while holding onto said holding bar or rail. One form of the invention contemplates that the two rear corners of the frame be mounted on snow runners while its leading end is devoid of such runner but is provided with means for attaching it to the rear end of a snowmobile and in this manner has its leading end held above the level of the snow surface and at the same time is connected to the snowmobile so as to provide power for its forward of movement. Another form of the invention contemplates that the leading end of the frame likewise be supported above the level of the surface of the snow by at least one additional snow runner whereby such support by a snowmobile, or the like, is not required. In this case the lift device can be pulled by any source of power that may be at hand such as a pull rope or other means.

IN THE DRAWINGS

FIG. 2 is a cross-sectional view of the ski lift shown in FIG. 1 and taken on the line 2—2 of FIG. 1 and looking in the direction of the arrows.

Figure 1:
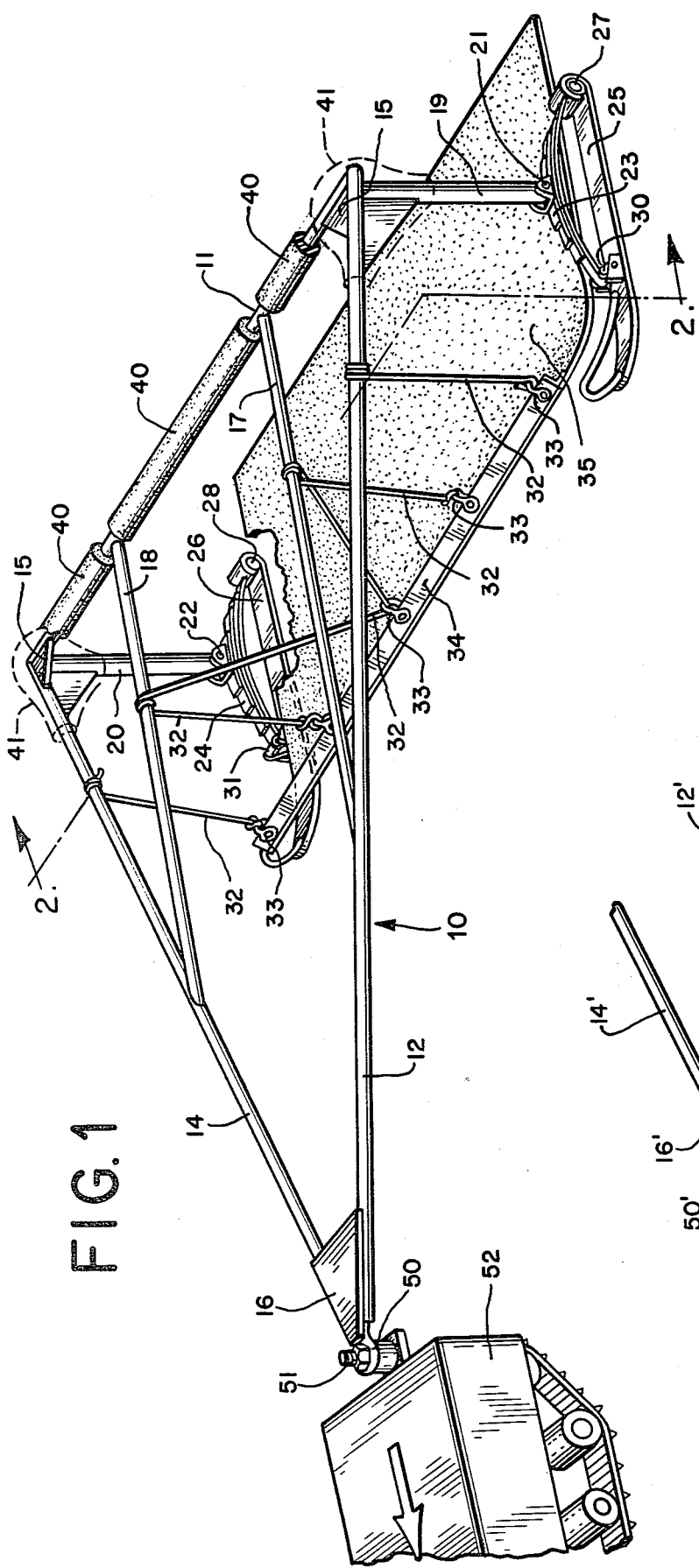
FIG. 1 is a perspective view of one form of the ski lift of this invention.
Figure 4:
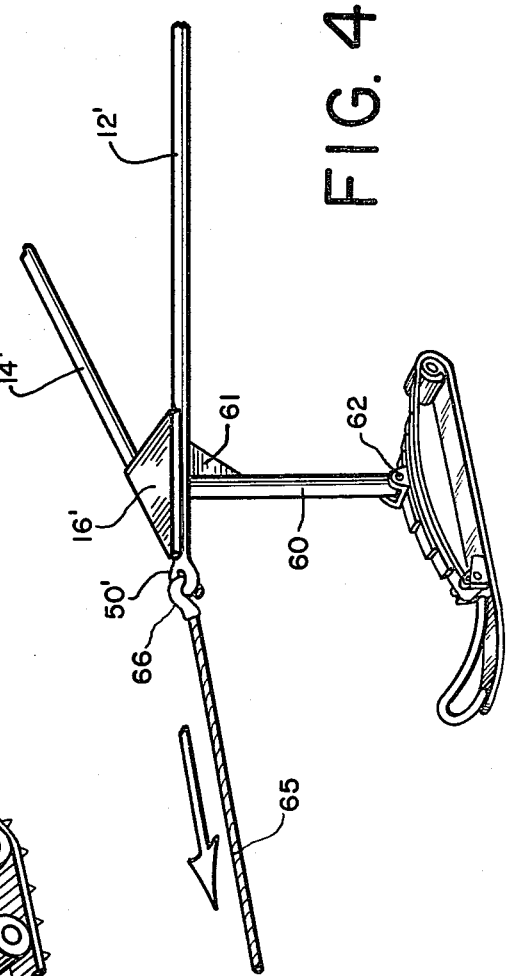

FIG. 3 is a fragmentary cross sectional view of the ski lift shown in FIG. 2 and taken on the line 3—3 of FIG. 2 and looking in the direction of the arrows and in addition illustrating a child in position thereon that would be occupied by him when riding the lift, and FIG. 4 is a fragmentary perspective view of a modified form of the invention showing the leading end of the lift as shown in FIG. 1 modified by the addition of a snow runner to support the leading end of the lift above the ground without reliance on the support supplied by the attaching means on the rear of the snowmobile.

DESCRIPTION OF PREFERRED EMBODIMENTS

By referring to the drawings it will be noted that the form of this invention illustrated in FIG. 1 comprises a frame 10 which is triangular in shape and consists of a rear bar or rail 11 preferably of metal and two forwardly extending and converging metal bars 12 and 14. These three bars are rigidly connected together as shown and are preferably reinforced at the rear corners by plates 15—15 and at the forward end by a plate 16 all of which are attached by welding or other suitable means.

The triangular frame 10 is further strengthed by intermediate bars 17 and 18 which extend between the rear bar 11 and the converging bars 12 and 14 respectively and are likewise connected by welding or the like.

The rear corners of the frame are supported on posts 19 and 20 which are rigidly attached to the frame and constitute legs for holding the rear end of the frame above the level of the snow surface. Posts 19 and 20 are pivotally connected respectively at 21 and 22 to leaf springs 23 and 24 which in turn are respectively connected to snow runners 25 and 26. The rear ends of the leaf springs are pivoted as at 27 and 28 to the rear of the snow runners and the forward ends of the springs are connected respectively to the snow runner by pivoted shackles 30 and 31, as shown. Suspended below the frame 10 as by means of ropes 32 or the like, and clevises 33 is a bar 34 disposed substantially parallel to said holding bar or rail 11 to which is attached a relatively thin flexible sheet-like member 35.

As best shown in FIG. 3 the bar 34 is mounted slightly above the surface of the snow so as not to interfere with the movement of the lift over the snow and in a position so that the sheet-like member 35 throughout its major extent rests on and is supported by the surface of the snow. The width of the sheet-like member is preferably such as to fit between the runners 25 and 26 supporting the rear end of the frame and so as to accommodate the desired number of children when standing on the sheet-like member. The sheet-like member 35 also extends rearwardly a sufficient distance to accommodate the skis of children when standing thereon in position to hold the rail 11 in the manner shown in FIG. 3.

Preferably padding material 40 of suitable kind is placed on the holding rail 11 to protect the children from the hardness and cold temperature of the metal. Similarly protective pads 41—41 are preferably placed on each of the rear frame corners as shown in dotted lines in FIG. 1 to protect the children from the sharp and hard corners of the frame 10. As shown in FIG. 1 the forward end of the frame 10 is provided with ring 50 or other hitching means to enable the frame to be attached to a pin 51 or the like mounted on a snowmobile 52. The snowmobile is thus adapted to pull the lift over the snow.

It will be noted that in this form of the invention the forward or leading end of the frame is held above the ground by the attaching means 50-51 so that no further support is required.

However as shown in FIG. 4 a modified form of this invention is contemplated which includes in addition to the bars 12', 14', plate 16' and attaching ring 50 a rigidly attached leg 60 affixed to the underside of the frame bars 12', 14' and plate 16' and a reinforcing angle plate 61. Leg 60 is in turn is hingedly connected at 62 to a leaf spring and snow runner assembly which in all respect is like the spring and runner assemblies previously described for supporting the rear end of the frame 10. In this case the forward end of the frame is supported above the ground by the forward leg 60 and attached snow runner and hence support by a snowmobile or the like is not necessary. This permits the frame to be pulled by other means such as a rope 65 and hook 66 connected to any available source of power.

It is apparent that various changes in the proposed construction can be made without departing from the concept and spirit of this invention. For instance it is not essential that the frame be triangular in shape as any appropriate shape will serve as well. Also it is not essential that the bar 34 be suspended by ropes as links of any suitable material will serve. It is only necessary that the bar serve as a means to which the leading edge of the flexible sheet-like member may be attached so that the sheet-like member is moved over the surface of the snow with the frame as described.

Whereas it is preferable to provide a sheet-like member made of a heavy rubberized fabric other materials will serve provided they are tough and strong enough to function in the intended way and will withstand the frictional wear in contact with the snow surface when loaded with a number of children standing on the top surface thereof. It has been found that a heavy mechanical drive belting material will serve well provided it is flexible enough to accommodate the varying contour of the surface over which it must slide. Some degree of flexibility is highly desirable because flexibility permits the irregularities of the snow covered ground surface to be transmitted through the sheet-like member and be felt by the children skiers in their feet and legs. This provides a close simulation of the feel which is experienced when skiing on the snow surface when not on the lift. This helps the children to more quickly learn how to balance on and compensate for such irregularities.

The lift may be made of any convenient size and in order to accommodate more children it is only necessary to increase the width of the frame and the sheet-like member. It has been found that ten or twelve children can be accommodated without difficulty and that such a group can be pulled upgrade with a single snowmobile of a type now readily available on the market.

It should also be understood that the use of this invention is not limited to serving children as it can accommodate adults and teenagers as well, it only being necessary to construct the lift of the particular size desired.

It is not intended that the invention be restricted to the particular disclosure of this preferred embodiment but rather that the invention be construed sufficiently broadly to cover any and all forms that fall within the scope of the appended claims.

I claim:

1. A ski lift especially adapted for children comprising a frame which is at least partially supported above the surface of the snow by snow runners and is adapted to be pulled over the snow surface, said frame including a horizontal bar extending substantially the transverse distance of the frame and disposed above the level of the snow surface a distance to constitute a holding rail for children standing at the level of the snow surface and a flexible sheet-like member extending substantially throughout the transverse distance of the frame and supported by the surface of the snow and means connecting said sheet-like member to said frame so that said sheet-like member is pulled forward with said frame as said frame is pulled over the surface of the snow, said flexible sheet-like member being located under said holding rail in such position that children wearing skis can be accommodated while standing on said sheet-like member and while so accommodated can conveniently grasp said holding rail.

2. A ski lift of the construction defined in claim 1 further characterized in that said means for connecting said sheet-like member to said frame includes a second bar attached to the leading edge of said sheet-like member and hangers connected to and carried by said frame and attached to said second bar.

3. A ski lift of the construction defined in claim 1 further characterized in that said frame is supported at its rear end on snow runners and its leading end is supported on and connected to a power driven snow vehicle.

4. A ski lift of the construction defined in claim 1 further characterized in that said frame is triangular with the leading end formed by converging frame members and holding rail extends between the trailing ends of such converging frame members and said snow runners support the two trailing corners of said frame.

5. A ski lift of the construction defined in claim 1 further characterized in that said frame is supported at its rear end on snow runners and its leading end is supported by at least one snow runner and has means for attaching a pull line thereto which in turn is connected to a source of power.

* * * * *